United States Patent [19]

Ellis

[11] 4,041,398
[45] Aug. 9, 1977

[54] BI-DIRECTIONAL DIGITAL COMMUNICATION NETWORK

[75] Inventor: Michael L. Ellis, San Diego, Calif.

[73] Assignee: ICC, Inc., San Diego, Calif.

[21] Appl. No.: 692,487

[22] Filed: June 3, 1976

[51] Int. Cl.$^2$ .............................................. H04B 1/46
[52] U.S. Cl. ................................. 325/308; 178/58 R
[58] Field of Search ............. 178/2 R, 2 C, 2 D, 2 E,
178/3, 4.1 B, 58 R, 4.1 R; 179/2 DP, 2 C;
325/37, 308, 309; 358/86

[56] References Cited

U.S. PATENT DOCUMENTS

| | | | |
|---|---|---|---|
| 3,374,309 | 3/1968 | Elich et al. | 178/2 R |
| 3,814,839 | 6/1974 | Lubarsky et al. | 178/2 C |
| 3,814,840 | 6/1974 | Lubarsky et al. | 178/2 C |
| 3,823,256 | 7/1974 | Wittebol | 178/3 |
| 3,836,888 | 9/1974 | Boenke et al. | 325/86 |
| 3,934,079 | 1/1976 | Barnhart | 325/308 |
| 3,937,882 | 2/1976 | Bingham | 179/2 DP |
| 3,943,447 | 3/1976 | Shomo | 325/309 |
| 3,997,718 | 12/1976 | Ricketts et al. | 325/308 |

*Primary Examiner*—Thomas A. Robinson
*Attorney, Agent, or Firm*—Poms, Smith, Lande & Glenny

[57] ABSTRACT

A bi-directional digital communication unit for requesting the performance of services by transmitting data to a central computer complex for purposes of processing the data to utilize it to initiate the performance of the requested services and for receiving data from the central computer complex for purposes of determining whether the request for the performed services was received and the performance of the requested services was initiated. Data is transmitted from the central computer to the communication unit on a carrier wave at a first low frequency $F_1$ and data is transmitted from the communication unit to the central computer at a second low frequency $F_2$. The data received by the system, on the carrier wave having frequency $F_1$, is demodulated and applied to valid address check means to determine if the central computer has transmitted a valid address to the unit. A modem register provides a data word which identifies the services that are requested by the user and transmits this data word to a data shift register which, if the system has received a valid address from the central computer, transmits the data word to the central computer, on a carrier wave at frequency $F_2$, to initiate the performance of the requested services. The system includes a receiver data register which, after a subsequent valid address by the central computer of the communication system, registers the receipt by the unit of a data word from the central computer signifying the receipt by the central computer of the request for services, and controls visual displays in the modem control code generator to visually inform the user of the receipt by the central computer of the data word generated by the modem control code generator and the initiation of the performance of the requested services. The system includes a master clock frequency divider and control logic for providing timing and logic pulses to synchronize the operation of the system and coordinate it with that of the central computer.

22 Claims, 12 Drawing Figures

BI-DIRECTIONAL DIGITAL COMMUNICATION NETWORK

BACKGROUND OF THE INVENTION

The present invention relates to a bi-directional digital communication unit and more particularly to a unit for requesting the performance of services by transmitting digital data to a central computer complex for purposes of processing that data and receiving digital data from the computer complex for purposes of determining whether the request for the performed services was received. The invention is particularly useful in conjunction with a community antenna system or cable television signal distribution system.

In a cable television system the television program signals are distributed to the various customers by way of a coaxial system. While such systems generally perform in a satisfactory manner, it would be desirable to employ the same coaxial cable for the transmission of various intelligent information to and from the users location to a central master station. The present state of the art to accomplish these tasks requires the use of a bi-directional RF cable television system. The cost of implementing a bi-directional cable television system is very high and the maintenance problems associated with it are extensive.

Typical bi-directional communication systems for performing the above noted functions are disclosed in U.S. Pat. Nos. 3,794,922 and 3,803,491, both to Osborn. These prior art devices typically perform bi-directional digital communication by the transmission of signals in the radio frequency range in the order of 3 megahertz to 300 megahertz. The signals which these devices receive must be decoded using filter circuits and the decoding is done by highly complex circuitry which causes such systems to be expensive. Furthermore, such devices typically do not have any means to notify the user that the central computer has received the data transmitted from the unit. In addition, such systems do not have auxiliary power supplies to provide power if the main power supply fails and correspondingly, they do not have any means to inform the central computer that the main power supply has failed.

SUMMARY OF THE INVENTION

The present invention provides a bi-directional digital communication system having a receiver/transmitter unit that does not operate at RF frequencies to thereby provide a substantially simplified circuit over similarly employed prior art devices. To attain this, the present invention provides a bi- directional communication unit which receives signals in the low frequency range between 3 kilohertz and 300 kilohertz. In the preferred embodiment, the central computer transmits a carrier signal having a separate address codeword associated with each individual unit to all the units on a rotational basis. Each address codeword has a data word associated with it and, in the preferred embodiment, the carrier on which each address codeword and the associated dataword is transmitted from the central computer is in the order of 200 kilohertz.

Each individual unit has a preassigned address codeword and when it detects an address codeword corresponding to the preassigned codeword of the unit, a valid address check means enables data to be transmitted along with the preassigned address codeword of the unit from the unit back to the central computer. The address codeword and the data word are transmitted on a carrier wave having a second low frequency signal which, in the preferred embodiment, is in the order of 100 kilohertz.

It is anticipated that in a system having ten thousand units of the type called for by the present invention, the central computer is capable of sampling each unit approximately once every 40 seconds. Thus, each unit detects a valid address approximately once every 40 seconds.

The present invention provides for a unit having an address and data receiver demodulator which includes a phase lock detector having an oscillator. The oscillator operates at a frequency which is the same as the frequency of the central computer and the phase lock detector adjusts the phase of the oscillator to operate synchronously in phase with the signal received from the central computer.

The received signal is transmitted to a valid address check circuit which includes an EXCLUSIVE OR gate having one input coupled to the receiver demodulator and a second input coupled to a shift register.

Several hard-wired address bytes are applied to the shift register to provide data corresponding to the address codeword of the unit and the shift register serially transmits the codeword corresponding to the individual address codeword of the unit to the second input of the EXCLUSIVE OR gate. If the received address from the central computer differs from the codeword transmitted by the shift register to the EXCLUSIVE OR gate, the unit has not received a valid address. If there is an identity between the codeword of the unit and the received address codeword from the central computer, the unit then receives and processes data transmitted from the central computer along with the codeword to the unit or transmits its codeword along with data from the unit back to the central computer.

If the unit is activated to transmit data to the central computer to request pay TV services or fire security or medical services or otherwise transmit information to the central computer, the data corresponding to the request is then transmitted through a transmitter modulator at a low frequency which, as indicated above, in the preferred embodiment, is in the order of 100 kilohertz.

The request for services is initiated by manual actuation by a user of a unit of a modem control code register which transmits data corresponding to the requested services through a multiplexer to the data shift register. The multiplexer is further operative to transmit the bytes of the address codeword, which is unique to each individual unit serviced by the central computer, to the data shift register.

A receiver data storage register is used in each unit for receiving data from the central computer after a request by the unit for services and the computer has received the request for services. The receiver data storage register receives data during the subsequent address cycle from the central computer. When the unit receives the next valid address, a control code register records data signifing the receipt by the central computer of the requested services during the previous address cycle of the central computer. The control code register then activates a visual display on the modem code register to visually inform the user of the individual unit of the receipt by the central computer of the data corresponding to the requested services during the previous address cycle.

The scope and flexibility of this system is such that the system is capable of controlling the use of premium television on a pay-by-demand basis. Public health and safety channels in the modem control code register are capable of monitoring the fire, security and medical status of the user's residence. A talk back channel in the modem control code register is capable of giving up to seven possible responses back to the central computer complex and being able to indicate to the resident whether his response has been received and whether that response is a correct or incorrect response to the question posed.

In addition, the system has been designed with an auxiliary power supply having an automated battery standby so that should central power fail, the system will automatically go to its own internal standby battery. The auxiliary power supply is coupled to the modem control code register to provide a signal to the central computer that the unit is operating on standby battery. The central computer then sets a clock which keeps track of the time during which this unit is on standby power. When a critical time has been reached the central computer notifies the dispatcher that this particular unit needs to be recharged and the dispatcher can then notify the user to take the proper steps.

Because of the need for a tight security on the cable system and to keep the integrity of the internal home security system, the digital system has been designed in such a way that it is a positive response type system. It is interrogated once every 40 seconds and it must respond to that interrogation giving the central computer complex the status of all its functions. If it fails to respond it will be re-interrogated three times, and if after the third time no response is received, it will indicate to the central computer operator that this unit is inoperative and should be checked out immediately.

Accordingly, an object of the present invention is to provide a new and improved bi-directional digital communication system which is low in initial cost, low in maintenance cost and highly reliable.

Another object is to provide a low frequency receiving and transmitting unit for receiving a low frequency address codeword and data word from a central computer and transmitting an address codeword and data word back to the central computer at a low frequency.

Yet another object is to provide simplified valid address check means for a bi-directional digital communication system using EXCLUSIVE OR circuitry.

Still another object of the present invention is to provide means for receiving digital data at a low frequency using phase lock detector means having a master oscillator for synchronizing the phase of the signals received from a central computer with the signals generated by the master oscillator.

A further object is to provide control code register means for a bi-directional digital communication unit for informing a user of the unit of the receipt by the central computer of data previously transmitted by the unit to the central computer.

Still a further object is to provide auxiliary power means, for a bi-directional communication system and a power monitoring circuit for providing auxiliary power to the unit in the event the main power supply becomes inoperative and for further informing a central computer of the necessity for repairing the main power supply.

Other objects, advantages and novel features of the present invention will become apparent from the following detailed description of the invention when considered in conjunction with the accompanying drawings.

DESCRIPTION OF THE PREFERRED EMBODIMENT

Figure 1:
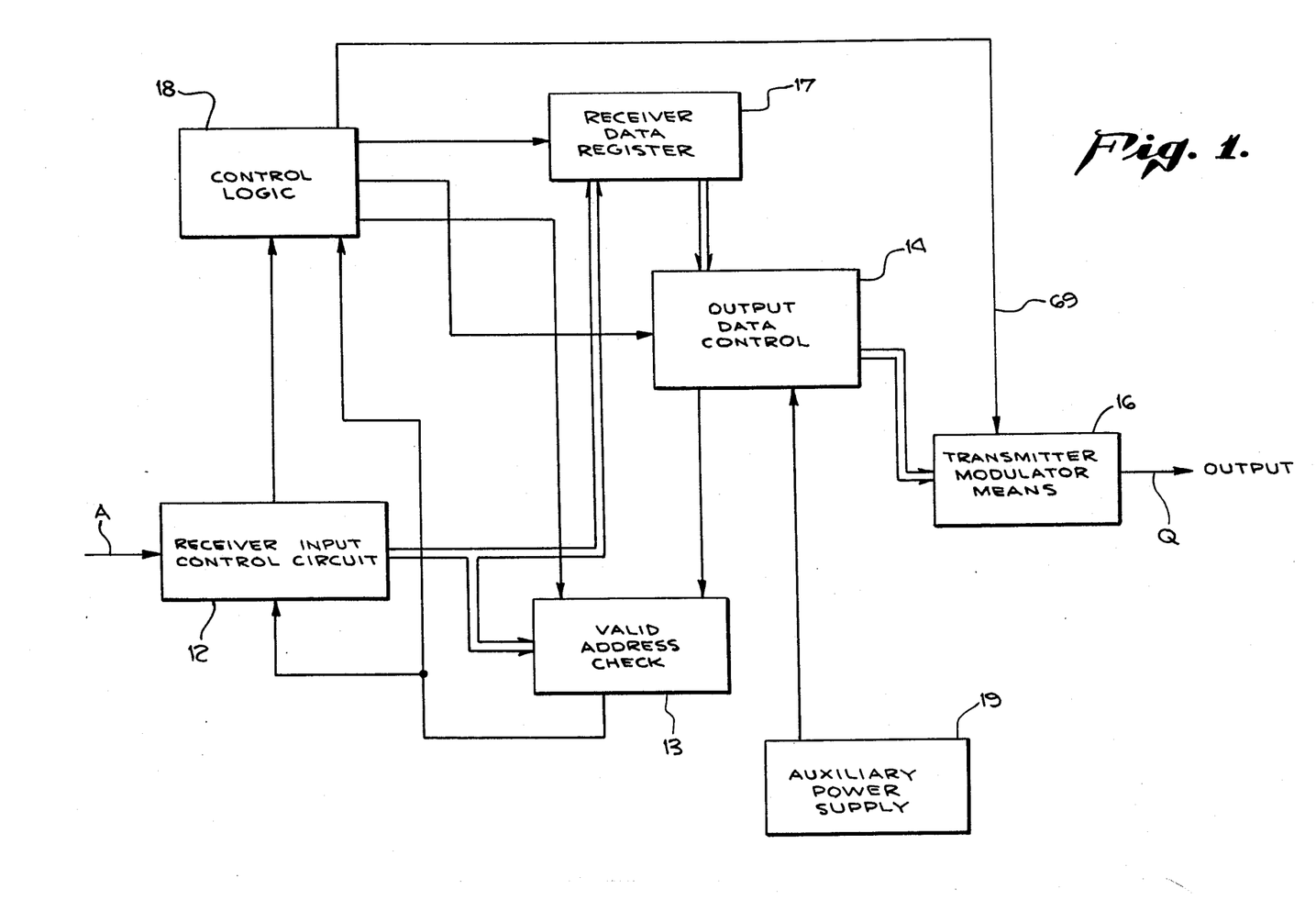
FIG. 1 is a block diagram of the bi-directional digital communication unit of the present invention.

Referring to FIG. 1, there is shown the bi-directional communication unit of the present invention for receiving and transmitting data to and from a central computer complex. Receiving means is provided for receiving digital address codewords and data words carried by a first low frequency signal from the central computer complex. In the preferred embodiment, this is shown as receiver input control circuit 12 which receives data at a first low frequency signal which, in the preferred embodiment, is in the order of 200 kilohertz which carries a line sync and start byte, an address codeword and a data word. The receiver input control circuit demodulates the low frequency input signal and applies the address codeword as well as the data codeword to valid address circuit means 13.

The present invention includes output data control means 14 which registers a line sync and start byte, the codeword associated with the individual unit as well as data to be transmitted to the central computer. The output data control 14 includes a shift register which registers the codeword associated with the individual unit as well as data and is coupled to the valid address check means 13.

The valid address check means compares the address code word received from the central computer with the codeword associated with the unit for checking for the receipt by the unit of a valid address from the central computer.

Transmitter modulator means is coupled to the output of the shift register of the output data control 14 for transmitting the address codeword associated with the unit and data bits from the shift register of the output data control 14 to the central computer at a second low frequency. In the preferred embodiment, this is shown as transmitter modulator means 16 for transmitting the line sync and start byte, the address codeword of the unit as well as data registered in the shift register of the output data control 14 to the central computer at a second low frequency in the order of 100 kilohertz.

Receiver data register means is coupled to the output of the receiver input control circuit 12 and to the input of the output data control 14 for registering the receipt of data by the receiving means from the central computer complex indicative of the receipt by the central computer complex of data previously transmitted by the unit to the central computer complex. In the preferred embodiment, this is shown as receiver data register 17 for receiving data from the central computer which informs the user that the data previously sent to the central computer has been received by the central computer. Thus, the receiver data register 17 is operative to inform the user that the services requested by the user were received by the computer and the performance of the services have been initiated.

The valid address check means 13 is coupled to the receiver input control circuit 12 to reset the receiver input if an invalid address code word is received by the unit from the central computer.

The valid address check circuit 13 is further coupled to control logic means 18 which generates control pulses which are coupled to both the receiver data register 17 and the output data control 14. The control logic 18 controls the receiver data register means 17 to synchronize the operation of it with the operation of the receiver input control circuit 12. If an invalid address code word is detected by the valid address check circuit 13, it activates the control logic 18 to reset the receiver data register 17. Similarly, the control logic 18 is coupled to the output data control 14 to control the transmission of data from the unit to the transmitter modulator means and then to the central computer. The receipt by the control logic 18 of a signal from the valid address check circuit 13 indicating the receipt of an invalid address activates the control logic 18 to transmit a reset pulse to the output data control 14 to reset it.

An auxiliary power supply 19 includes a standby battery to provide power to the system in the event of a power failure. The auxiliary power supply 19 is coupled to the output data control 14 for activating it to transmit data to the central computer indicative of the operation of the unit on its auxiliary power supply. The central computer may then initiate the repair of the main power supply of the unit.

Figure 2:
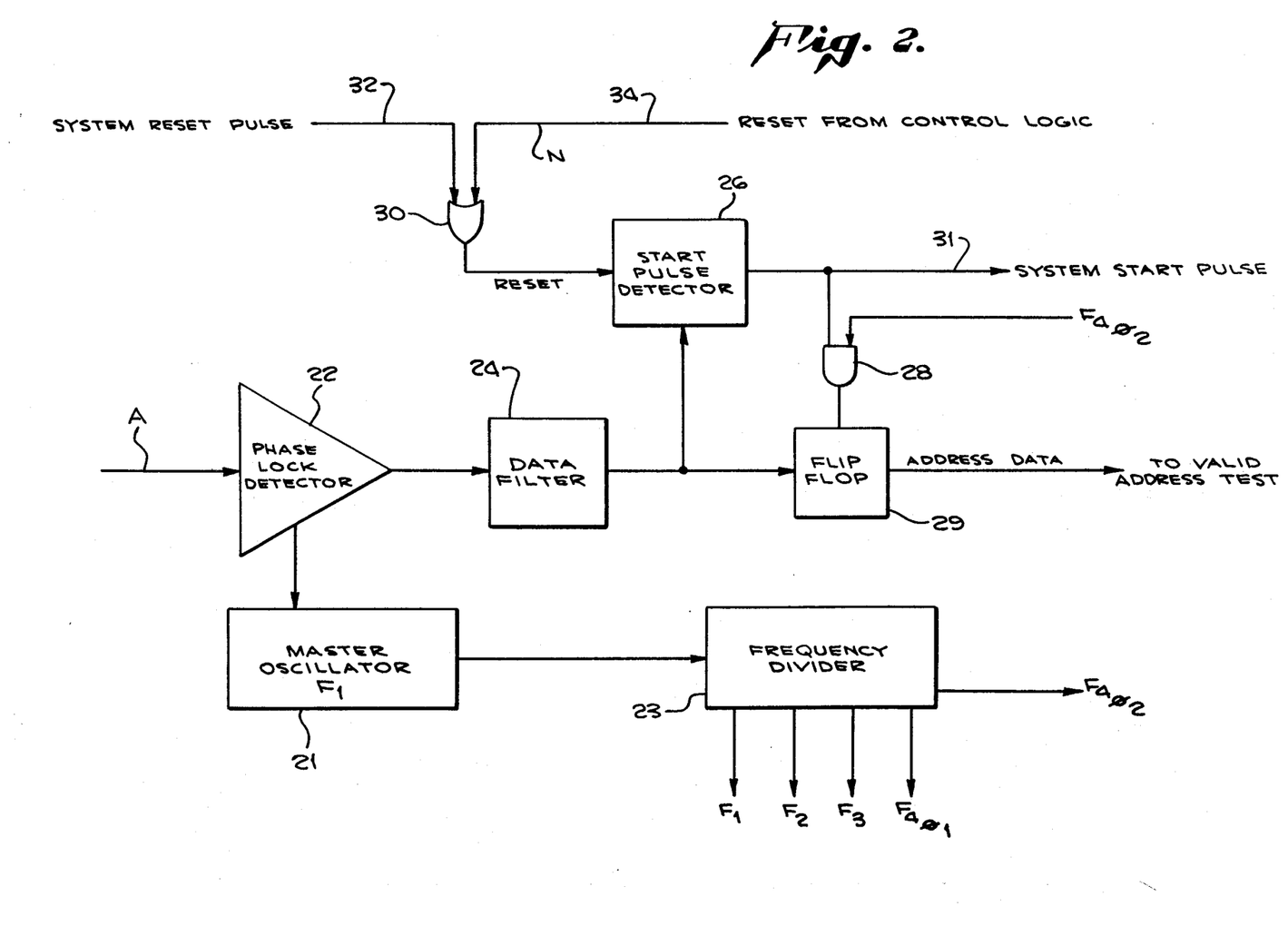
FIG. 2 is a detailed block diagram of the receiver input control of the present invention.

A master oscillator provides a signal having a frequency equal to the low frequency input signal which is received by the receiver. In the preferred embodiment, this is shown in FIG. 2 as master oscillator 21. Phase lock detector means is provided for synchronizing the phase of the low frequency signal received by the unit from the central computer and in the preferred embodiment this is shown as phase lock detector 22. The phase lock detector serves as a narrow bank pass filter that filters out all signals except the low frequency input carrier signal which, as indicated above, is in the order of 200 kilohertz in the preferred embodiment. Thus the master oscillator 21, in conjunction with the phase lock detector 22 provides a 200 kilohertz signal which is in phase with the 200 kilohertz carrier signal received by the unit from the central computer.

The master oscillator 21 is coupled to master clock frequency divider means which provides a plurality of signals each having a frequency equal to the quotient of the low frequency input signal divided by a predetermined number. The frequency divider means thereby provides clock pulses. In the preferred embodiment, this is shown as frequency divider 23 which has outputs $F_1$ which is equal to the incoming low frequency of 200 kilohertz signal; $F_2$ equal to one-half of the incoming low frequency signal; $F_3$ equal to one-quarter of the incoming low frequency signal; and $F_4$ equal to one-eighth of the incoming low frequency signal. Thus, with a 200 kilohertz input frequency signal, $F_1$ is equal to 200 kilohertz; $F_2$ equal to 100 kilohertz; $F_3$ equal to 50 kilohertz and $F_4$ equal to 25 kilohertz. $F_4$ has two phases of operation with $F_{401}$ in phase with the incoming signal and $F_{402}$ being delayed by one-half cycle.

The incoming address codeword and data word are transmitted through the phase lock detector 22 to a data filter 24 which filters out the low frequency 200 kilohertz carrier signal to provide the incoming address codeword and the data word.

The receiving means further includes start pulse detecting means for detecting the beginning of an address from the central computer complex. In the preferred embodiment this is shown as start pulse detector means 26 which receives a number of binary 1 pulses followed by two binary 0 pulses to thereby detect the beginning of the receipt by the unit of an address from the central computer. Once the start pulse detector means 26 has detected the incoming start pulse, it enables the controlling AND gate 28 to enable a flip-flop 29 to pass the received address and codeword at a clock pulse rate established by the $F_{402}$ output of the frequency divider 23. Since, in the preferred embodiment, this output of the frequency divider 23 is 25 kilohertz, the flip-flop 29 transmits the received address and codeword at the rate of 25 kilohertz. At the same time, the start pulse detector 26 transmits a system start pulse at output terminal 31 to the control logic 18. As will be explained more fully hereinafter in conjunction with the valid address test circuit, when an invalid address is detected, a system reset pulse is transmitted from the valid address check means to the system reset terminal 32 and is transmitted through OR gate 30 to reset start pulse detector 26 to remove a system start pulse at terminal 31 which has the effect of disenabling the entire receiving means from receiving a digital address and data bits until the next subsequent digital address codeword and data word are received by the receiving means. The start pulse detector 26 may be also reset by a reset pulse from the control logic provided at input 34 to OR gate 30 after the unit has received a valid address codeword and data word and has transmitted its codeword and data word to the central computer complex.

Figures 3A, 3B, 3C:
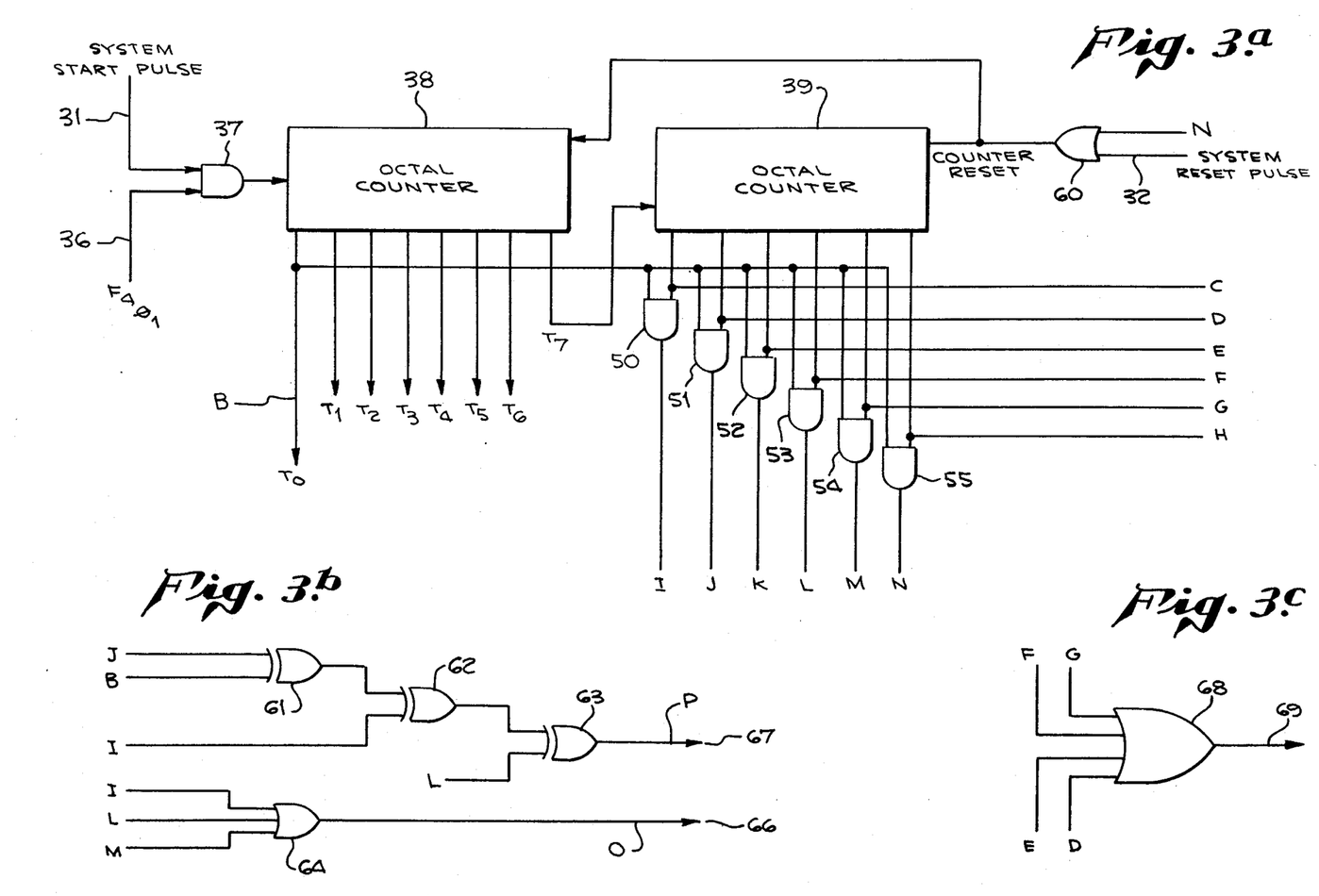
FIG. 3a is a detailed block diagram of the timing pulse generator logic of the present invention.
FIG. 3b is a detailed block diagram of the multiplexer selector control of the present invention.
FIG. 3c is a diagram of the transmitter enable logic gate of the present invention.

The control logic means shown in FIGS. 3a, 3b and 3c provide control pulses at a clock rate determined by $F_{401}$ which, in the preferred embodiment, is 25 kilohertz. The input clock pulse from the frequency divider 23 is applied to input terminal 36 of AND gate 37 which is enabled by a system start pulse from terminal 31. The input clock pulses are transmitted through octal counters 38 and 39 to provide timing pulses to control the rest of the logic circuitry.

Figure 10:
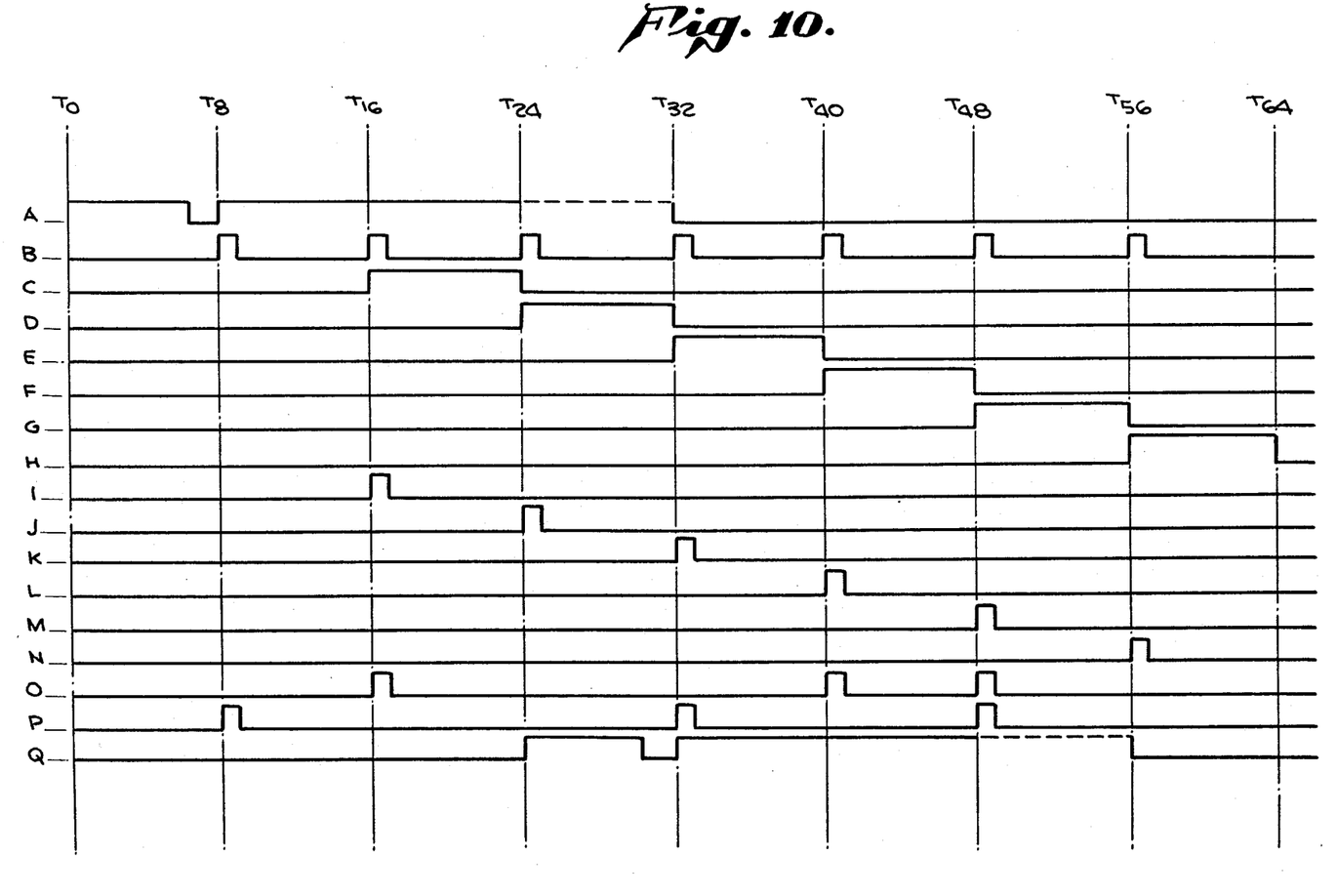
FIG. 10 shows a timing diagram having waveforms 10a through 10q which describe the sequence of operation of the components of present invention.

The octal counter 38 has eight outputs, and, as will be explained more fully in conjunction with the timing diagram, only the first output $T_0$ and the eighth output $T_7$ are used in conjunction with the control function performed by the control logic. The octal counter 39 has eight outputs but only six are used in the present invention. Each of the six outputs is coupled respectively to AND gates 50 through 55. The AND gates 50 through 55 produce output pulses I, J, K, L, M and N respectively as shown in the timing diagram. The six outputs of octal counter 39 used by the present invention also produce output pulses C, D, E, F, G and H as also shown in the timing diagram.

The octal counters 38 and 39 are reset by a system reset pulse transmitted from terminal 32 through OR gate 60 if the valid address circuit detects an invalid address codeword from the central computer. The control logic 18 is thereby reset to receive the next address codeword. Furthermore, the control logic means may be reset by a pulse N shown in the timing diagram applied to a second input of OR gate 60 after the unit has received a valid address codeword and a data word to the central computer to thereby enable the units to be reset to receive the next address codeword from the central computer.

The logic control means further provides multiplexer selector control means shown in FIG. 3b which controls a multiplexer, which will be explained more fully hereinafter, in the output data control 14. The multiplexer selector control means includes EXCLUSIVE OR gates 61, 62 and 63 and OR gate 64 and multiplexer selector outputs 66 and 67. EXCLUSIVE OR gate 61 has two inputs with pulse A applied to one input at the beginning of the octal count of octal counter 38 and pulse J provided by the output of AND gate 51 applied to the second input. EXCLUSIVE OR gate 62 has one input coupled to the output of EXCLUSIVE OR gate 61 and a second input coupled to the output of AND gate 50 corresponding to pulse I shown in the timing diagram. OR gate 64 has 3 inputs, each coupled to the outputs of AND gates 50, 53 and 54 respectively to receive input pulses I, L and M shown in the timing diagram. The output pulses on output terminals 66 and 67 therefore provide control pulses shown in FIGS. 10o and 10p to control the output data control 14 in a predetermined sequence to transmit the line sync and start bit, address codeword and data word of the unit to the central computer.

FIG. 3c is a diagram of the transmit enable logic OR gate 68 having 4 inputs each respectively coupled to the outputs of terminals D, E, F and G of octal counter 39. OR gate 68 has an output terminal 69 which is coupled to transmitter modulator means 16 to enable it to transmit the codeword associated with the unit and a data word to the central computer after the unit detects a valid address codeword and a data word from the central computer.

Figures 4, 5:
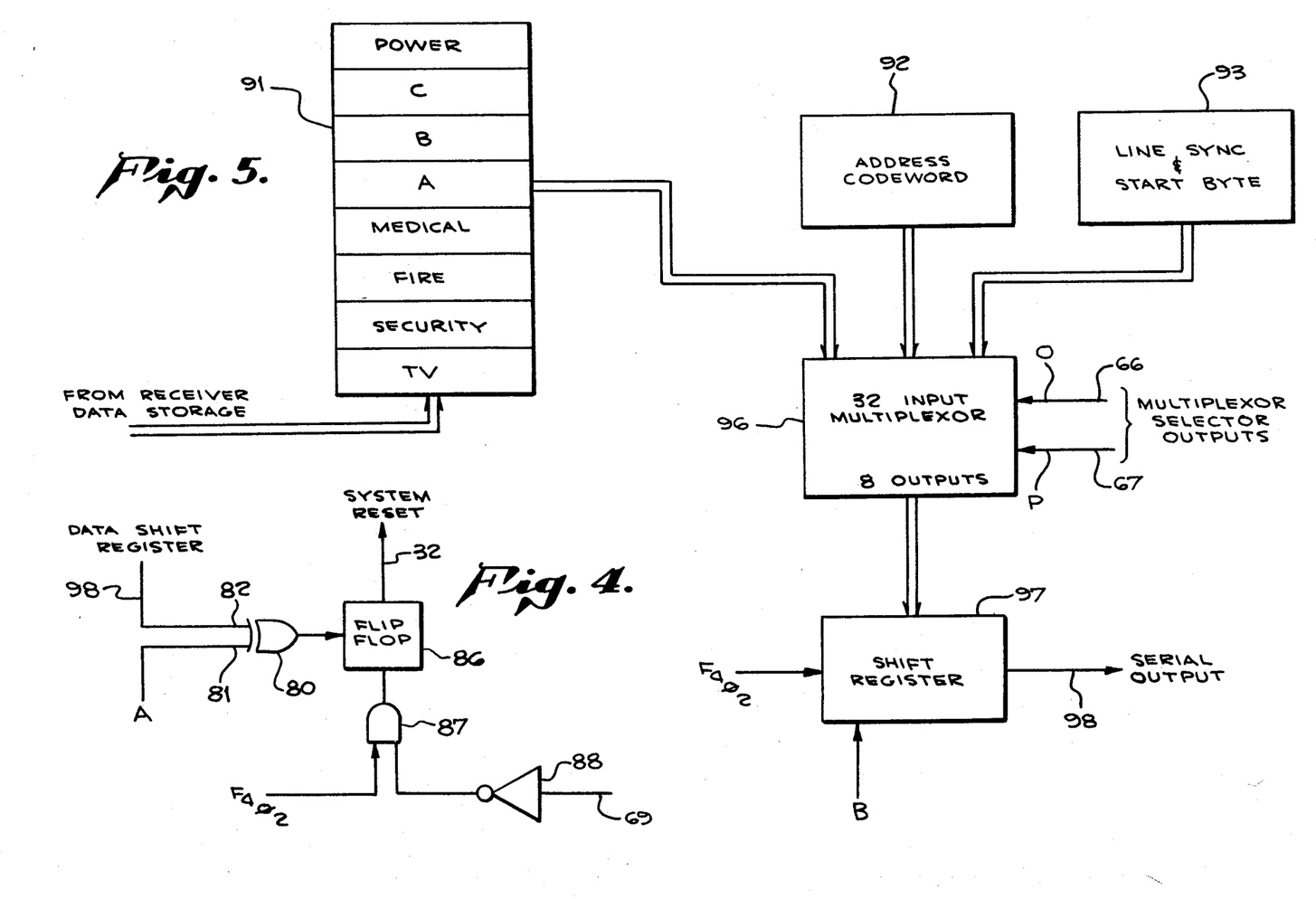
FIG. 4 is a detailed block diagram of the valid address test circuit.
FIG. 5 is a block diagram of the output data control circuitry.

The unit includes valid address check means shown in FIG. 4 for comparing the address codeword received from the central computer with the codeword associated with the unit for the receipt by the unit of a valid address from the central computer complex. In the preferred embodiment, the valid address check means includes EXCLUSIVE OR gate 80 having one input 81 which is coupled to the output of the receiver input control circuit 12 to thereby apply the address codeword and data word to the EXCLUSIVE OR gate 80. A second input 82 applies the codeword which is hard-wired into the unit to the EXCLUSIVE OR gate 80 from a shift register which will be explained more fully hereinafter.

If the EXCLUSIVE OR gate 80 detects a dissimilarity between the address codeword received from the central computer and the codeword associated with the unit, it provides an output signal which is applied to the input of flip-flop 86 which generates a system reset pulse on line 32 which is applied to OR gate 30 shown in FIG. 2 to reset the start pulse detector 26 of the receiver input control circuit to thereby disenable AND gate 28 to inhibit the further transmission of bits from the received address codeword. The system reset pulse is also transmitted along line 32 to one input of OR gate 60 shown in FIG. 3a to reset octal counters. 38 and 39 to inhibit the generation of further timing pulses.

If the unit receives a valid address from the central computer having a codeword which is identical to the internally hard-wired codeword of the unit, the output of EXCLUSIVE OR gate 80 is in the binary 0 state and the output terminal 32 of flip-flop 86 is in the binary 0 state to thereby enable the entire address codeword and data word received by the unit from the central computer to be registered in the receiving unit.

The AND gate 87 controls the operation of flip-flop 86 and is enabled by one input at the clock pulse rate from output terminal $F_{402}$ from the frequency divider 23. A second input to AND gate 87 is received from an inverter 88 which receives an input signal from the transmitter enable logic OR gate 68 along terminal 69 to thereby enable AND gate 87 to pass clock pulses to the flip-flop 86 during periods $T_8$ to $T_{24}$ so that the flip-flop 86 is clocked only during the address portion of the incoming message. Thus, flip-flop 86 is operative to transmit a system reset pulse along output terminal 32 while the input receiver is comparing the received address codeword from the central computer with the internally hard-wired codeword of the unit only during the period of time of receipt of the address codeword by the unit.

The output control circuit is shown in greater detail in FIG. 5 and includes modem control code register means for registering data. In the preferred embodiment, this is shown as modem register 91 having eight binary state output terminals. Thus, the modem register 91 is capable of registering 256 different data words each corresponding to a requested function. In the preferred embodiment, modem register 91 is shown as registering exemplary functions of pay TV, security, fire, medical, blank channels A, B, and C, and auxiliary power function. A predetermined data word is assigned to each function and the data word may be registered in the modem register by any suitable manual means, not shown.

An internally hard-wired address codeword register 92 provides an internally hard-wired address codeword which is associated with the individual unit and different from the codeword associated with every other unit serviced by the central computer. In the preferred embodiment, the address codeword register 92 is formed of two 8 bit hard-wired address registers.

A line sync and start byte register 93 provides a line sync and start byte pulse which is transmitted by the unit to the central computer to allow the central computer sufficient time to enable it to be synchronized with the incoming address codeword and data word from the unit.

The modem register 91, the address codeword register 92 and the line sync and start byte register 93 are applied to a multiplexer 96 which transmits the contents of the respective registers to a data shift register 97 in accordance with a predetermined sequence established by the multiplexer selector control shown in FIG. 3b. The multiplexer logic selector inputs 66 and 67 control the multiplexer 96 to transmit first the contents of the line sync and start byte register 93 between the period $T_{24}$ to $T_{32}$ as shown in the timing diagram. The multiplexer then transmits the 16 bit address codeword from the address codeword register 92 between the period $T_{32}$ through $T_{48}$ as shown in the timing diagram. The multiplexer 96 then transmits the data word in the modem register 91 during the period $T_{48}$ through $T_{56}$ as shown in the timing diagram. Thus, the multiplexer 96 has 32 inputs with eight inputs associated with the line sync and start byte register 93; 16 with the address codeword register 92; and eight associated with the modem register 91. The multiplexer 96 transmits eight bits in parallel and provides an output on serial output terminal 98.

The shift register 97 is clocked at a clock pulse rate established by the $F_{402}$ output of frequency divider 23 to thereby operate, in the preferred embodiment, at a rate of 25 kilohertz. The shift register 97 receives a pulse B shown in the timing diagram to enable it to receive the address byte codewords, the line sync and start byte pulses and the data word for serial transmission at the clock pulse rate on serial output terminal 98 if the control logic has not been reset during the receipt by the unit of the address codeword from the central computer. After the unit transmits the line sync and start byte word, the address codeword and the data word serially from the shift register 97, a pulse N shown in the FIG. 10n of the timing diagram is generated from the output of AND gate 55 shown in FIG. 3a to reset the control logic by providing an input to OR gate 60 to reset the octal counters 38 and 39 and an input to OR gate 30 to reset the start pulse detector 26.

Figures 6, 8, 9:
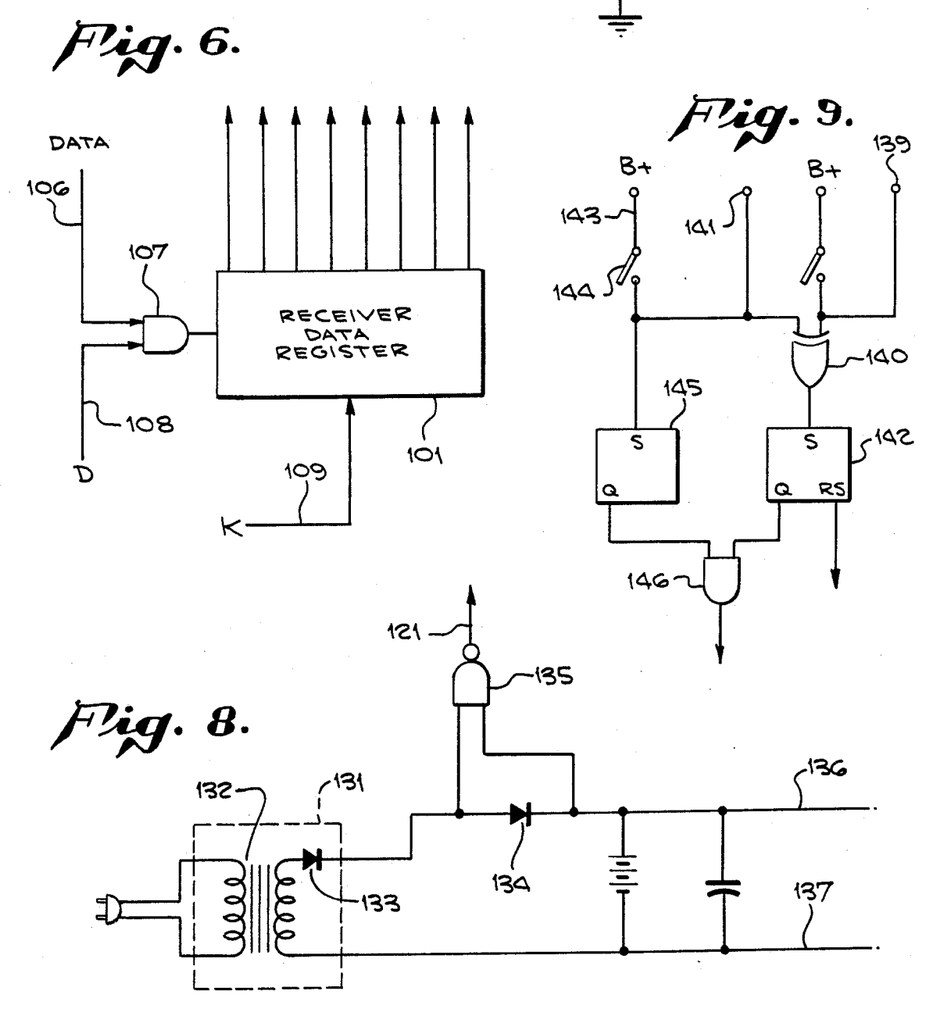
FIG. 6 is a block diagram of the receiver data register
FIG. 8 is a block diagram of the power supply.
FIG. 9 is a block diagram of the false alarm checking circuit.

The receiver data register means 17 is shown in greater detail in FIG. 6 and includes a receiver data shift register 101 which in the preferred embodiment is preferably an eight bit shift register having a serial input and eight parallel binary outputs coupled to the eight stages of the modem control code register. The receiver data shift register 101 is operative to receive data from the central computer indicative of the receipt by the central computer of the data previously registered in the modem control code register and transmitted to the central computer corresponding to the services requested by the user of the unit.

The data is applied to data input 106 of AND gate 107 and pulse D generated by octal counter 39, shown in FIG. 3a is applied to input 108 of AND gate 107 to receive data between $T_{24}$ and $T_{32}$ as shown in the timing diagram. This is the period of time during which the central computer complex is transmitting data and the individual unit is receiving data. The eight bits of the received data word are clocked into the eight bit shift register 101 and transmitted in parallel along the associated output stages of the shift register 101 to the corresponding stage of the modem control code register in response to pulse K on input terminal 109 during time $T_{32}$ as shown in the timing diagram.

The modem control code register means includes a suitable visual display means, not shown, for providing a visual display of the data registered in it. The eight outputs of the receiver data shift register 101 may thereby be coupled to the visual display means in the modem control code register to provide a visual indication to the user that the central computer has received the data which was previously registered in the modem control code register corresponding to the services requested by the user of the unit. The user may thereby be assured that the performance of the services has been initiated after the computer has received the data corresponding to requested services previously transmitted by the user's unit to the central computer.

Figure 7:
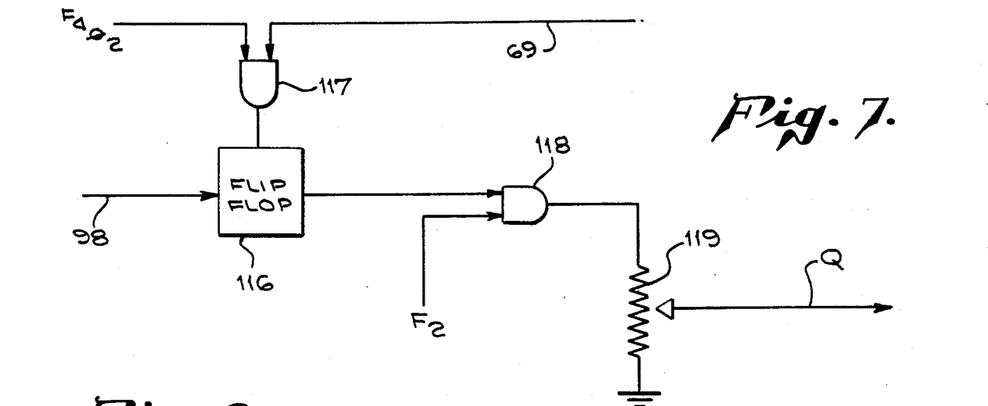
FIG 7 is a block diagram of the transmitter and modulator means.

The transmitter modulator means is shown in FIG. 7 and receives one of the outputs from the frequency divider 23 to enable the transmitter modulator to transmit an address codeword and a data word from the shift register 97 to the central computer at a second low frequency. In the preferred embodiment, the transmitter modulator means 16 includes a flip-flop 116 which receives the serial output of shift register 97 along serial output line 98. The flip-flop 116 is clocked to operate at the frequency $F_{402}$ which is applied to one input of AND gate 117. The second input to AND gate 117 is applied from output 69 of the transmitter enable logic circuit shown in FIG. 3c to enable flip-flop 116 to be clocked between the period $T_{24}$ to $T_{56}$ as shown in the timing diagram in waveforms D, E, F and G to transmit the waveform shown in FIG. 10q. The output of flip-flop 116 is applied to one input of AND gate 118. A series of modulator pulses having a frequency $F_2$ provided by frequency divider 23 is applied to the second input of AND gate 118 to thereby provide an address codeword and a data word to be transmitted at a frequency in the preferred embodiment of 100 kilocycles to the central computer. The output of AND gate 118 is applied to a resistor 119 which is used as an output level control to set the proper line driving level of the 100 kilohertz signal transmitted from the unit to the central computer.

Thus, the unit is capable of receiving address codewords and data words on a first low frequency carrier signal in the order of 200 kilohertz and transmits address codewords and data words on a second low frequency carrier signal in the order of 100 kilohertz.

The auxiliary power supply is shown in FIG. 8 and includes an auxiliary power supply output terminal 121 which is coupled to the modem control code register means. As indicated above, the modem control code register means may include a visual display of the contents thereof and the auxiliary power supply 121 is coupled, in the preferred embodiment, to the modem control code register means to provide a visual indication of the state of operation of the auxiliary power supply. Thus, if the main power supply of the unit is inoperative, the modem control register is operative to visually inform the user that the unit is operating on its standby battery in the auxiliary power supply. Furthermore, the unit transmits data in the modem control code register indicative of the operation of the unit on its auxiliary power supply to the central computer to thereby inform the central computer of the need for repairing the main power supply to the unit.

The auxiliary power supply includes a molded plug 131 which includes a power transformer 132 and a half wave rectifier 133 to supply a low DC voltage to a rectifier 134 having inputs of NAND gate 135 coupled across it. The NAND gate 135 thereby monitors the voltage on either side of the rectifier 134. The normal power is applied across terminals 136 and 137 and if there is a failure in normal power supply, the cathode terminal of the rectifier 134 has a low voltage applied to it while the anode terminal has a high voltage applied to it. This dissimilarity of inputs to the NAND gate 135 causes it to provide an output pulse which is transmitted to the modem control code register 91 to register data indicitive of the operation of the system on standby power.

During the normal operation of the power supply, power is applied to terminals 136 and 137 and both sides of the rectifier 134 have the same voltage thereby inhibiting NAND gate 135 to prevent any transmission of a signal to the modem control code register 91.

FIG. 9 shows a circuit for checking the alarm devices at the time the system is armed. A security arming terminal 139 is normally at a low voltage and when the system is armed it is in the high state to provide a binary one to an EXCLUSIVE OR gate 140. An external security device is coupled to terminal 141 and provides a normally low voltage to the EXCLUSIVE OR gate 140. The output of EXCLUSIVE OR gate 140 sets a security arming flip-flop 142. A health and safety channel 143 is coupled through a switch 144 to a flip-flop 145. The output of flip-flop 142 and 145 are applied to the inputs of a security control AND gate 146. The net result of the circuitry is that the security portion of the channel modem control code register can only be activated after it has been armed and it cannot be armed unless all the alarm devices are in their normal mode of operation.

Referring now to the timing diagrams shown in FIG. 10, FIG. 10a shows the waveform transmitted from the central computer to the unit beginning at times $T_0$. The central computer transmits an eight bit byte between $T_0$ and $T_8$ which is used as a line sync and start byte to lock up the internal control of the unit with the central computer and initiate the generation of logic pulses from the control logic 18. This causes the unit to check the received address codeword from the central computer against the internally hard-wired codeword associated with the unit for the receipt of a valid address. The control logic 18, as will be subsequently discussed hereinafter also produces control pulses for actuating the unit to transmit a line sync and start byte and an address codeword associated with the unit followed by a data word from the unit back to the central computer.

The line sync and start includes six binary 1 pulses between $T_0$ and $T_6$ followed by two binary 0 pulses during $T_7 - T_8$. This eight bit line sync and start byte is received by the receiver input control 12 and is extracted from the 200 kilohertz carrier wave by the data filter 24. It is then applied to the start pulse terminal 31 to one input of AND gate 37 shown in FIG. 3a. A clock pulse from terminal $F_{401}$ is applied to terminal 36 of AND gate 37 to activate the control logic 18 to initiate the function of comparing the received address codeword from the central computer with the internally hard-wired codeword associated with the individual unit.

The line sync and start byte shown in FIG. 10a between $T_0$ and $T_8$ is followed by two address bytes each having eight bits between $T_8$ and $T_{24}$. If the unit has transmitted a data word to the central computer during the previous valid address by the central computer of the unit, the two received address bytes are followed by a data word, between $T_{24}$ and $T_{32}$, which is applied to the receiver data register 17 to confirm to the user that the computer has received the previously transmitted data word.

Upon receipt by the control logic 18 of a system start pulse, it produces control signals to synchronize the operation of the unit to operate in a predetermined sequence as shown in FIGS. 10b through 10p. Upon receipt by the octal counter 38 of a system start pulse after the unit has received the line sync and start byte, the octal counter 38 produces a pulse B on its first output state in intervals of eight clock pulses. As shown in FIG. 10b, the pulse B occurs at $T_8$, $T_{16}$, $T_{24}$, $T_{32}$, $T_{40}$, $T_{48}$, and $T_{56}$. The pulse B is applied to the shift register 97 shown in FIG. 5, to control it to accept a parallel input from the multiplexer 96. It is also applied to one input of EXCLUSIVE OR gate 61 of the multiplexer selector control shown in FIG. 3b to control the multiplexer.

The control logic 18 also produces a pulse shown in FIG. 10c between $T_{16}$ and $T_{24}$ at the first output terminal of octal counter 39. Since the input of octal counter 39 is coupled to the last output terminal of octal counter 38, the frequency of octal counter 39 is one-eighth that of octal counter 38. This waveform shown in FIG. 10c is applied to AND gate 50 shown in FIG. 3a in conjunction with pulse 3 to produce the waveform shown in FIG. 10i, which as will be explained more fully hereinafter, is applied to OR gate 64 shown in FIG. 3b to provide the multiplexer logic control.

The waveforms shown in FIGS. 10d, 10e, 10f and 10g are produced by the second, third, fourth, and fifth output terminals respectively of octal counter 39. Waveform D is produced between $T_{24}$ and $T_{32}$; E, between $T_{32}$ and $T_{40}$; F, between $T_{40}$ and $T_{48}$; and G, between $T_{48}$ and $T_{56}$.

Waveform D is coupled to input 108 of AND gate 107 of the receiver data storage unit shown in FIG. 6 to transmit the contents of the receiver data register 101 to the modem register 91 if the address codeword received by unit from the central computer includes a data word which is transmitted to the receiver data register 17. As indicated above, the address codeword received by the unit from the central computer will include a data word if the unit has previously transmitted a data word from the modem register 91 to the central computer requesting services. The data word received by the unit and transmitted from the central computer confirms to the user that the central computer has received the data word previously transmitted by the unit to the central computer and the performance of the requested services has been initiated. Under such circumstances, the unit receives the data word between $T_{24}$ and $T_{32}$ as shown in FIG. 10a and the data word is applied to receiver data register means 17 shown more particularly as receiver data register 101 in FIG. 6.

Waveform D controls the receiver data register 101 shown in FIG. 6 between $T_{24}$ and $T_{32}$ to transmit the contents of the register to modem register 91 shown in FIG. 5 to compare the contents of modem register 91 with the received data word to determine whether the computer has received the data word in the modem register during the previous address cycle. If there is a coincidence between the data word associated with the address byte shown in FIG. 10a and received between $T_{24}$ and $T_{32}$ with the data word registered in modem register 91, visual display means not shown on the modem register is actuated to visually inform a user that the computer has received the previously transmitted data word and the performance of the requested services has been initiated.

Waveform D is further used in conjunction with the waveforms E, F and G to control the transmitter modulator means shown in FIG. 7 to transmit a line sync and start byte, two address codeword bytes and a data word between $T_{24}$ and $T_{56}$ from the unit to the central computer. As shown in FIG. 3c, waveforms D, E, F and G are applied to the inputs of OR gate 68 to provide an output 69 which, as shown in FIG. 7 is applied to an input of AND gate 117 of the transmitter modulator means. The other input to AND gate 117, $F_{402}$, provides clock pulses which are thereby transmitted through AND gate 117 between $T_{24}$ and $T_{56}$. If the unit detects a valid address, the flip-flop 116 transmits the line sync and start byte between $T_{24}$ and $T_{32}$ as shown in FIG. 10q. As indicated above, since the output of flip-flop 116 is transmitted through AND gate 118 which has a second input at a frequency $F_2$, which in the preferred embodiment is 100 kilohertz, the output waveform shown in FIG. 10q is transmitted at a frequency in the order of 100 kilohertz.

Similarly, if a valid address is detected, pulse E is transmitted through OR gate 68 and applied along line 69 through AND gate 117 to control flip-flop 116 to transmit the first address byte of the codeword associated with the unit between $T_{32}$ and $T_{40}$. The pulse F controls the transmitter modulator means to transmit the second address byte between $T_{40}$ and $T_{48}$ and the pulse G shown in FIG. 10q controls the OR gate 68 to activate the transmitter modulator means 16 to transmit the data word between $T_{48}$ and $T_{56}$ as shown in FIG. 10q.

The pulse H shown in FIG. 10h is produced by the sixth output of octal counter 39 as shown in FIG. 3a and is applied to one input of AND gate 55 with the pulse B applied to the second input of AND gate 55 to produce the pulse shown in FIG. 10n which is used to reset the system.

The pulses shown in FIGS. 10i, 10j, 10l and 10m are produced by AND gates 50, 51, 53 and 54 respectively as shown in FIG. 3a. These pulses along with pulse B are applied to the multiplexer selector control shown in FIG. 3b to produce the waveforms shown in FIGS. 10o and 10p which are transmitted on output terminals 66 and 67 to control the multiplexer 96 as shown in FIG. 5. The waveforms O and P provide binary 0 and binary 1 pulses and the multiplexer 96 is prewired to be responsive to combinations of 0 and 1 pulses on input terminals 66 and 67 to transmit the contents of line sync and start byte register 93, address codeword register 92 and modem register 91 in sequence. An exemplary logic control to the multiplexer selector is described in the following table:

| LOGIC CONTROL TO MULTIPLEXER SELECTOR | | | |
|---|---|---|---|
| TIME PERIOD | O | P | FUNCTION OF MULTIPLEXER |
| $T_8$ | 0 | 1 | Transmit Address Byte 1 from address code word register 92 to shift register 97 |
| $T_{16}$ | 1 | 0 | Transmit Address Byte 2 from address code word register 92 to shift register 97 |
| $T_{24}$ | 0 | 0 | Transmit Line Sync and Start Byte from line sync and start byte register 93 to shift register 97 |
| $T_{32}$ | 0 | 1 | Transmit Address Byte 1 from address code word register 92 to shift register 97 |
| $T_{40}$ | 1 | 0 | Transmit Address Byte 2 from address code word register 92 to shift register 97 |
| $T_{48}$ | 1 | 1 | Transmit data word from modem control code register 91 to shift register 97 |

Thus, the multiplexer selector control shown in FIG. 3b controls the multiplexer 96 shown in FIG. 5 to transmit the address byte 1 from address codeword register 92 to shift register 97 between $T_8$ and $T_{16}$ in response to a binary 0 on line 66 and a binary 1 on line 67 at $T_8$. The shift register 97 is responsive to pulse B at $T_8$ to transmit byte 1 of the address codeword of the unit between $T_8$ and $T_{16}$ along output terminal 98 to input 82 of the EXCLUSIVE OR gate 80 of the valid address test circuit.

During the same period of time, the first byte of the received address codeword from the central computer is transmitted to input terminal 81 of the EXCLUSIVE OR gate 80 and if there is any dissimilarity between the bits of the two bytes, the flip-flop 86 is activated to transmit a system reset pulse 32 to OR gate 30 of the receiver input control shown in FIG. 2 to reset the system. The system reset pulse is also transmitted to OR gate 60 of the timing pulse generator logic shown in FIG. 3a to reset the control logic 18.

If there is no dissimilarity between the bits of the received address byte 1 and the byte 1 of the codeword of the unit, the multiplexer 96 is enabled by a binary 1 on line 66 (FIG. 10o) and a binary 0 on line 67 (FIG. 10p) to transmit between $T_{16}$ and $T_{24}$ the second byte of the codeword of the unit to the shift register 97 and pulse B again activates the shift register 97 at $T_{16}$ to transmit the contents of the shift register 97 to the EXCLUSIVE OR gate 80 to check for an identity between the second byte of the received address and the second byte of the codeword associated with the unit. If there is a complete identity between the two bytes of the received codeword and the two bytes of the codeword associated with the unit, thereby indicating the receipt by the unit of a valid address from the central computer, the flip-flop 86 does not produce any system reset pulse and the operation of the timing pulse generator logic shown in FIG. 3a proceeds to transmit the line sync and start byte, the two bytes of the address codeword associated with the unit and the byte of data word from the modem register to the central computer complex.

At the same time, if the central computer has received a data word during the previous address cycle and has transmitted it back to the unit after registering it, for purposes of informing the user that the performance of the requested services has been initiated, the data word is transmitted to the receiver data register shown in FIG. 6 between $T_{24}$ and $T_{32}$ during the duration of pulse D as explained above.

Pulse K, shown in FIG. 10k is applied through terminal 109 to the receiver data register 101 to activate it to transmit the received data word between $T_{32}$ and $T_{40}$ to the modem register 91. If there is a coincidence between the data word received by the unit and the contents of the modem register, the modem register visually informs the user that the central computer has received the previously transmitted data word to thereby assure the user that the performance of the requested services has been initiated.

At $T_{32}$ the multiplexer selector control also is activated by a binary 1 pulse as shown in FIG. 10p transmitted on line 67 and a binary 0 pulse shown in FIG. 10o transmitted on line 66 to transmit the byte 1 of the address codeword from address codeword register 92 to shift register 97 which is responsive to a pulse B at $T_{32}$ to transmit the byte 1 of the codeword serially on line 98 through flip-flop 116 and AND gate 118 from the unit to the central computer as shown in FIG. 10q.

At $T_{40}$ the multiplexer selector control provides a binary 1 on line 66 as shown in FIG. 10o and a binary 0 on line 67 as shown in FIG. 10p to activate the multiplexer 96 to transmit byte 2 of the address codeword from the unit to the central computer as shown in FIG. 10q.

Finally, at $T_{48}$, the multiplexer selector control provides a binary 1 on the output line 66 and a binary 1 on the output line 67 as shown in FIGS. 10o and 10p to activate the multiplexer 96 to transmit the data word in the modem register 91 to the shift register 97 and, in response to a pulse B at $T_{48}$, through the transmitter modulator means 16 to the central computer to request services such as pay TV, fire, security and medical assistance.

The pulse N shown in FIG. 10n is produced by the gating of AND gate 55 shown in FIG. 3a in response to an input pulse B and a second input pulse H, shown in FIGS. 10b and 10h respectively. As shown in FIG. 10n, pulse N is produced after the unit has transmitted the line sync and start byte, the address codeword of the unit and a data word between $T_{24}$ and $T_{56}$ as shown in FIG. 10q. Thus, after the unit has completed its transmission function, pulse N resets the entire unit during $T_{56}$ to receive the next valid address from the central computer.

The pulse N is applied to OR gate 30 shown in FIG. 2 on terminal 34 to reset the start pulse detector 26 to enable it to receive the next line sync and start byte from the computer. The resetting of the start pulse detector 26 effectively resets the entire receiver input control circuit 12.

The pulse N is also applied to one terminal of OR gate 60 shown in FIG. 3a to reset octal counters 38 and 39 to thereby effectively reset the entire control logic 18 to begin its control function upon receipt of the next address from the central computer.

Obviously, many modifications and variations of the present invention are possible inspite of the above teachings. It is therefore to be understood that within the scope of the appended claims, the invention can be practiced otherwise than as specifically described.

I claim:

1. A low frequency bidirectional digital communication unit for use over coaxial cables of the cable TV system type, for requesting the performance of services by transmitting data to a central computer comprising:
   address byte register means for registering an address codeword associated with said unit,
   modem control code register means for registering a data word corresponding to services requested by said unit,
   shift register means coupled to said address byte register means and said modem control code register means for receiving the contents of said address byte register means and the contents of said modem control code register means in parallel and for shifting said address codeword and said data word out of said data shift register serially to provide a serial output to the central computer on the coaxial cable, and
   transmitter modulator means coupled to the serial output of said shift register means for transmitting said serial output of said shift register means to said central computer on a low frequency carrier wave to request the performance of services.

2. The unit as described in claim 1 and further including multiplexer means coupled between said address byte register means and said shift register means and further coupled between said modem control code register means and said shift register means to transmit the contents of said address byte register means and the contents of said modem control code register means to said shift register in accordance with a predetermined sequence.

3. The unit as described in claim 2 and further including control logic means coupled to said multiplexer means for controlling said multiplexer means to transmit the contents of said address byte register means and the contents of said modem control code register means to said shift register means in accordance with said predetermined sequence.

4. The unit as described in claim 1 and further including means coupled to said modem control code register means for receiving a data word from said central computer for registering the receipt by the central computer of the data word in said modem control code register means corresponding to services requested by said unit.

5. The unit as described in claim 4 and wherein said means for receiving a data word from said central computer includes
   receiving means for receiving said data word carried by a low frequency carrier wave from the central computer, and
   receiver data register means coupled to the output of said receiving means and to the input of said modem control code register means for registering the receipt of a data word indicative of the receipt by the central computer complex of the data word in said modem control code register means corresponding to services requested by said unit.

6. The unit as described in claim 5 and wherein said modem control code register means includes visual display means for providing a visual display of the data word registered therein and,
   said receiver data register means is coupled to said visual display means to provide a visual indication of the receipt by said central computer of said data word registered in said modem control code register means corresponding to the services requested by the unit.

7. The unit as described in claim 6 and further including control logic means coupled to the output of said receiving means and responsive thereto for generating control pulses, said control logic means being coupled to said receiver data register means for controlling said receiver data register means to synchronize the operation of said receiving means with the operation of said receiver data register means.

8. The unit as described in claim 7 and further including multiplexer means coupled between said address byte register means and said shift register means and further coupled between said modem control code register means and said shift register means, said multiplexer means being coupled to said control logic means and responsive thereto to transmit the contents of said address byte register means and the contents of said modem control code register means to said shift register means in accordance with a predetermined sequence.

9. The unit as described in claim 1 and further including auxiliary power supply means and wherein said modem control code register means includes visual display means coupled to said auxiliary power supply means for providing a visual display indicative of the state of operation of said auxiliary power supply.

10. The unit as described in claim 1 and further including:
    an alarm device for providing an alarm, when set to its normal mode of operation, in the event of a security breach,
    said modem control register means including a security channel coupled to said alarm device for providing a data word to signal an alarm, said security channel including false alarm checking means for preventing said security channel from being activated unless said alarm has been armed and is operating in the normal mode of operation.

11. A method of transmitting address codewords and data words in a cable TV system over a coaxial cable between a bidirectional subscriber communication unit and a central computer complex comprising the steps of:
 transmitting at a first low frequency a plurality of address codewords from said central computer complex to each said subscriber unit in successive order;
 receiving each of said plurality of address codewords at said unit;
 comparing each of said address codewords with an internally hard-wired address codeword associated with each said unit for ascertaining the receipt by said unit of a valid address codeword identifying said unit from the central computer complex;
 transmitting at a second low frequency said address codeword associated with said unit and a data word identifying services including television programming desired at the location of said unit from said unit to said central computer complex subsequent to the receipt by said unit of a valid address codeword from said central computer complex; and
 transmitting a confirmatory data codeword from said central computer complex associated with the address codeword identifying the originating communication unit.

12. A method as defined in claim 11 further including the step of decoding the confirmatory signal at the unit and providing a local indication of the services represented by the confirmatory signal.

13. A method as defined in claim 11 further including the step of filtering out undesired signals including television signals at the input to said communication unit.

14. In a cable TV type system for transmitting requests for services between a plurality of receiving stations, each having associated bidirectional communication units, and a central computer and service supplying complex, the improvements comprising:
 means at each said communication unit for registering a unique address codeword associated with said unit;
 means at each said communication unit for periodically receiving and recognizing digital address codewords transmitted to said communication unit at a first predetermined low frequency, and in a predetermined time slot allocated to each cable TV subscriber;
 means at each said communication unit for registering service requests including television programming requests originated by the cable TV subscriber at the location of said communications unit, in digital form;
 means at each said communication unit for transmitting to the central computer and service supplying complex, a digital signal including first the unique address of the communications unit, and secondly, the nature of the service request at a second predetermined low frequency; and
 means at each said communications unit for receiving a confirmatory digital signal, including both the unique address and the desired service codes, transmitted at said first predetermined low frequency, and for verifying the correctness of the implemented service signal being sent back from the central complex.

15. A system as defined in claim 14 further comprising at least one coaxial cable for bidirectional communication with said communication unit.

16. A system as defined in claim 14 further comprising means included in said receiving means for accepting said first low frequency, and for filtering out signals at other frequencies.

17. A system as defined in claim 14 wherein said first and second low frequencies are both in the range from 50 to 400 kilohertz.

18. In a Pay TV type system for transmitting requests for services between a plurality of receiving stations each having associated bidirectional communication units, and a central computer and service supplying complex, the improvements comprising:
 means at each said communication unit for registering a unique address code word associated with said unit;
 means at each said communication unit for periodically receiving and recognizing digital address codewords transmitted to said communication unit at a first predetermined low frequency, and in a predetermined time slot allocated to each Pay TV subscriber;
 means at each said communication unit for registering service requests including television programming requests, originated by the Pay TV subscriber at the location of said communications unit, in digital form;
 means at each said communication unit for transmitting to the central computer and service supplying complex, a digital signal representing the nature of the service request in the response time period allocated to each specific communication unit, at a second predetermined low frequency; and
 means at each said communications unit for receiving a confirmatory digital signal, including both the unique address and the desired service codes, transmitted at said first predetermined low frequency, and for verifying the correctness of the implemented service signal being sent back from the central complex.

19. A system as defined in claim 18 further comprising:
 at least one coaxial cable for bidirectional communication with said communication unit, and
 means included in said receiving means for accepting said first low frequency, and for filtering out signals at other frequencies.

20. A system as defined in claim 18 further comprising:
 shift register means for registering an address codeword associated with said unit, and
 valid address check means having one input coupled to said receiving means and a second input coupled to said shift register for comparing said address codeword received from said central computer with said codeword associated with said unit for checking for the receipt by said unit of a valid address from said central computer complex.

21. A system as defined in claim 18 further comprising:
 a master oscillator for providing a signal having a frequency equal to said first low frequency, and
 phase-lock detector means for synchronizing the phase of said first low frequency signal with the phase of said signal provided by said master oscillator.

22. A system as defined in claim 18 wherein said first and second low frequencies are both in the range from 50 to 400 kilohertz.

* * * * *